(12) United States Patent
Hur et al.

(10) Patent No.: US 7,916,234 B2
(45) Date of Patent: Mar. 29, 2011

(54) LIQUID CRYSTAL DISPLAY HAVING FIRST AND SECOND THIN FILM TRANSISTORS AND FIRST AND SECOND SUB-PIXEL ELECTRODES

(75) Inventors: Seung-hyun Hur, Cheonan-si (KR); Back-won Lee, Cheonan-si (KR); Chae-woo Chung, Cheonan-si (KR); Sahng-ik Jun, Yongin-si (KR); Kweon-sam Hong, Seoul (KR); Sang-gun Choi, Suwon-si (KR); Yong-woo Lee, Seoul (KR); Yong-jo Kim, Seoul (KR); Hyun-duck Son, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 264 days.

(21) Appl. No.: 11/833,794

(22) Filed: Aug. 3, 2007

(65) Prior Publication Data
US 2008/0030640 A1    Feb. 7, 2008

(51) Int. Cl.
G02F 1/136    (2006.01)
G02F 1/1343    (2006.01)

(52) U.S. Cl. .......................... 349/48; 349/144; 349/146

(58) Field of Classification Search .................... 349/48, 349/144, 146
See application file for complete search history.

(56) References Cited

U.S. PATENT DOCUMENTS

| 2004/0263747 | A1* | 12/2004 | Chae | 349/139 |
| 2006/0146242 | A1* | 7/2006 | Kim et al. | 349/129 |
| 2007/0002253 | A1* | 1/2007 | Kim et al. | 349/144 |
| 2007/0052897 | A1* | 3/2007 | Kim et al. | 349/139 |

FOREIGN PATENT DOCUMENTS

KR    1020050080313    8/2005

* cited by examiner

Primary Examiner — Mark A Robinson
Assistant Examiner — Paul C Lee
(74) Attorney, Agent, or Firm — Innovation Counsel LLP

(57) ABSTRACT

A liquid crystal display (LCD) capable of preventing light leakage includes first and second gate lines which extend in a horizontal direction, a data line which is insulated from the first and second gate lines and crosses the first and second gate lines, first and second thin film transistors (TFTs) which are respectively connected to the first and second gate lines and are connected to the data line, and a pixel electrode which extends in zigzag fashion at an inclination to the first and second gate lines and is divided into a first area and a second area in a direction in which the pixel electrode extends. The pixel electrode includes a first sub-pixel electrode which is connected to the first TFT and has the first area and upper and lower portions of the second area, and a second sub-pixel electrode which is connected to the second TFT, has a middle portion of the second area, and has a lateral side adjoining a first portion of the first sub-pixel electrode, an upper side adjoining a lower side of an upper second portion of the first sub-pixel electrode, and a lower side adjoining an upper side of a lower second portion of the first sub-pixel electrode, the first and second areas being connected by a plurality of connection electrodes, and at least one of the connection electrodes overlapping the second gate line.

7 Claims, 18 Drawing Sheets

LIQUID CRYSTAL DISPLAY HAVING FIRST AND SECOND THIN FILM TRANSISTORS AND FIRST AND SECOND SUB-PIXEL ELECTRODES

CROSS-REFERENCE TO RELATED APPLICATION

This application claims priority from Korean Patent Application No. 10-2006-0073493 filed on Aug. 3, 2006 in the Korean Intellectual Property Office, the disclosure of which is incorporated herein in its entirety by reference.

BACKGROUND OF THE INVENTION

1. Field of the Invention

The present invention relates to a liquid crystal display (LCD), and more particularly, to an LCD having excellent lateral visibility without light leakage.

2. Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer. The applied electric field determines the orientations of LC molecules in the LC layer to adjust the polarization of incident light.

Among the LCDs, a vertically aligned (VA) LCD, in which LC molecules are aligned such that the long axes of the LC molecules are perpendicular to the plates in the absence of an electric field, offers a high contrast ratio and a wide reference viewing angle. The wide viewing angle of the VA LCD is achieved by forming cutouts in and protrusions on the field-generating electrodes.

However, images displayed by a patterned vertically aligned (PVA) LCD equipped with gaps become brighter nearer to the lateral sides of the PVA LCD, thereby decreasing lateral visibility. In order to improve lateral visibility of an LCD, a variety of methods of dividing a pixel electrode into a pair of sub-pixel electrodes and driving the sub-pixel electrodes using different thin film transistors (TFTs) so that the sub-pixel electrodes can be supplied with different voltages have been suggested.

In order to drive two TFTs, two gate lines must be provided for each pixel. In this case, one of the two gate lines is disposed so as to cross the corresponding pixel. However, when a gate line that is disposed so as to cross a pixel is exposed through a gap, part of a liquid crystal corresponding to the exposed portion of the gate line is affected by an electric field generated by the gate line. In general, a gate-off voltage applied to a gate line is much lower than a voltage applied to other parts of a pixel region. Thus, a portion of a liquid crystal layer corresponding to an exposed gate line may have a different alignment angle from other portions of the liquid crystal and may thus appear to leak light at an early stage of the driving of an LCD.

SUMMARY OF THE INVENTION

According to an aspect of the present invention, a liquid crystal display (LCD) comprises first and second gate lines which extend in a horizontal direction, a data line which is insulated from the first and second gate lines and crosses the first and second gate lines, first and second thin film transistors (TFTs) which are respectively connected to the first and second gate lines and are connected to the data line, and a pixel electrode which extends in zigzag fashion at an inclination to the first and second gate lines and is divided into a first area and a second area in a direction in which the pixel electrode extends. The pixel electrode includes a first sub-pixel electrode which is connected to the first TFT and has the first area and upper and lower portions of the second area. A second sub-pixel electrode is connected to the second TFT, has a middle portion of the second area, and has a lateral side adjoining a first portion of the first sub-pixel electrode, an upper side adjoining a lower side of an upper second portion of the first sub-pixel electrode, and a lower side adjoining an upper side of a lower second portion of the first sub-pixel electrode. The first and second areas are connected by a plurality of connection electrodes, and at least one of the connection electrodes overlaps the second gate line.

According to another aspect of the present invention, there is provided an LCD including: first and second gate lines which extend in a horizontal direction, a plurality of data interconnections which include a data line that is insulated from the first and second gate lines and crosses the first and second gate lines, first and second source electrodes that branch off from the data line, first and second drain electrodes which are respectively separated from the first and second source electrodes and face the first and second source electrodes, and a third drain electrode that branches off from the second drain electrode. A first TFT is connected to the first gate line, the first source electrode, and the first drain electrode. A second TFT is connected to the second gate line, the second source electrode, and the second drain electrode. A pixel electrode extends in zigzag fashion at an inclination to the first and second gate lines is divided into a first area and a second area in a direction in which the pixel electrode extends. The pixel electrode includes a first sub-pixel electrode which is connected to the first TFT and has the first area and upper and lower portions of the second area, and a second sub-pixel electrode which is connected to the second TFT. The second sub-pixel has the middle portion of the second area, and a lateral side adjoining a first portion of the first sub-pixel electrode, an upper side adjoining a lower side of an upper second portion of the first sub-pixel electrode, and a lower side adjoining an upper side of a lower second portion of the first sub-pixel electrode. The first and second areas are connected by a plurality of connection electrodes. The second gate line overlaps the third drain electrode at a boundary between the first area and the second area.

According to still another aspect of the present invention, an LCD comprises first and second gate lines which extend in a horizontal direction, a plurality of data interconnections which include a data line that is insulated from the first and second gate lines and crosses the first and second gate lines, first and second source electrodes that branch off from the data line, first and second drain electrodes which are respectively separated from the first and second source electrodes and face the first and second source electrodes, and a third drain electrode that branches off from the data line. A first TFT is connected to the first gate line, the first source electrode, and the first drain electrode. A second TFT is connected to the second gate line, the second source electrode, and the second drain electrode. A pixel electrode extends in zigzag fashion at an inclination to the first and second gate lines and is divided into a first area and a second area in a direction in which the pixel electrode extends. The pixel electrode includes a first sub-pixel electrode which is connected to the first TFT and has the first area and upper and lower portions of the second area, and a second sub-pixel electrode. The second sub-pixel electrode is connected to the second TFT, has a middle portion of the second area, and has a lateral side adjoining a first portion of the first sub-pixel electrode, an upper side adjoining a lower side of an upper second portion of the first sub-pixel electrode, and a lower side adjoining an upper side of a lower second portion of the first sub-pixel electrode, the first and second areas are connected by a plurality of connection electrodes, and the second gate line is overlapped by the third source electrode at a boundary between the first area and the second area.

BRIEF DESCRIPTION OF THE DRAWINGS

The above and other features and advantages of the present invention will become more apparent by describing in detail preferred embodiments thereof with reference to the attached drawings, in which.

DETAILED DESCRIPTION OF THE INVENTION

Figure 1A:
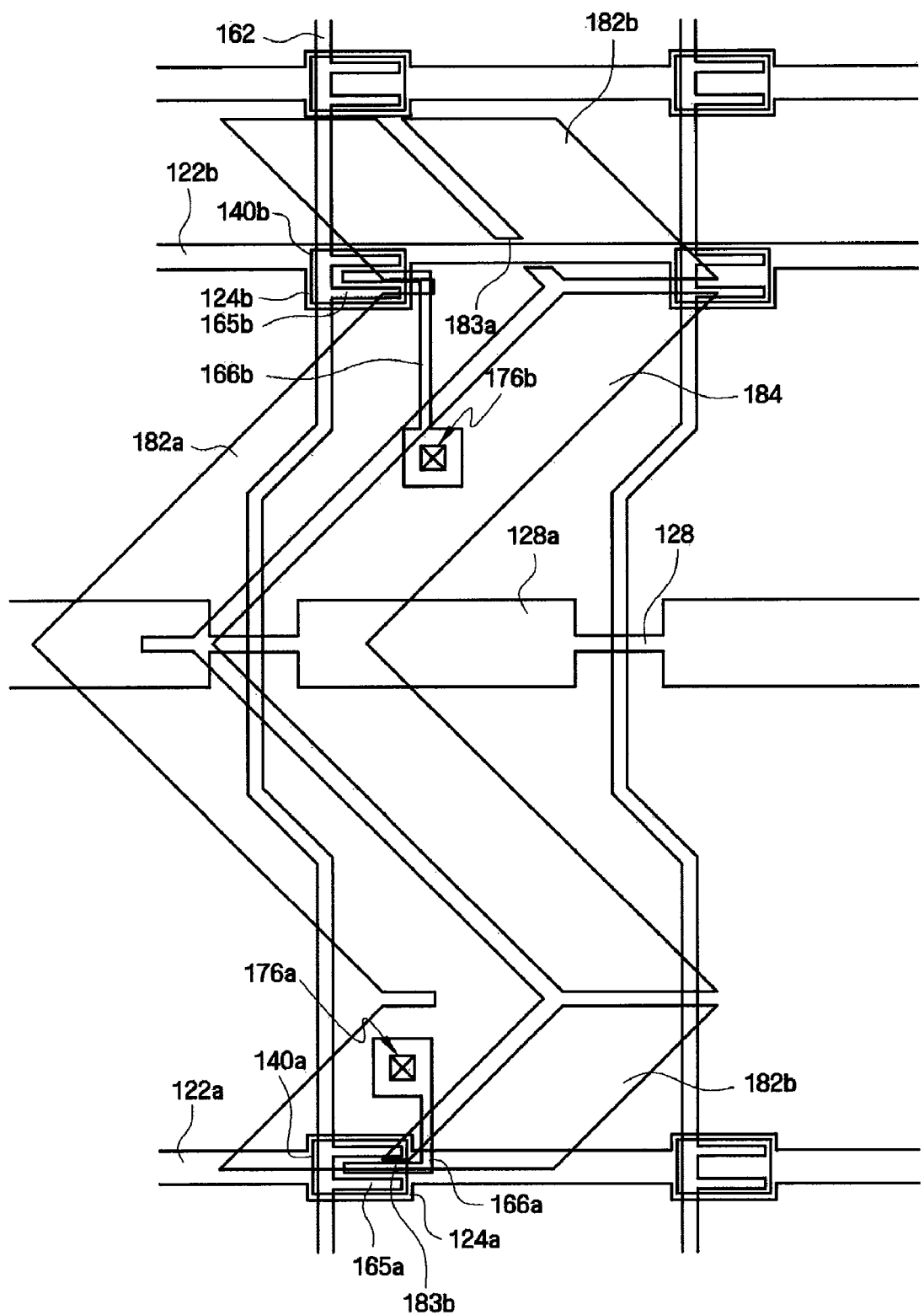
FIG. 1A is a layout of a first display panel according to an embodiment of the present invention.

In the drawings, the thickness of layers and regions are exaggerated for clarity. In the following description, it will be understood that when an element or a layer is referred to as being "on" another element or layer, it can be directly on the other element or layer, or intervening layers or elements may also be present. In contrast, when an element is referred to as being "directly on" another element, there are no intervening elements present. Like reference numerals refer to like elements throughout the specification. Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The present invention will be described with reference to perspective views, cross-sectional views, and/or plan views, in which preferred embodiments of the invention are shown. Thus, the profile of an exemplary view may be modified according to manufacturing techniques and/or allowances. For example, while an etched region is shown in a rectangular shape, it may be rounded or have a predetermined curvature. Thus, regions shown in the drawings are illustrated in schematic form and the shapes of the regions are presented simply by way of illustration and not as a limitation.

LCDs of the present invention will now be described more fully with reference to the accompanying drawings, in which exemplary embodiments of the invention are shown.

Figure 1B:
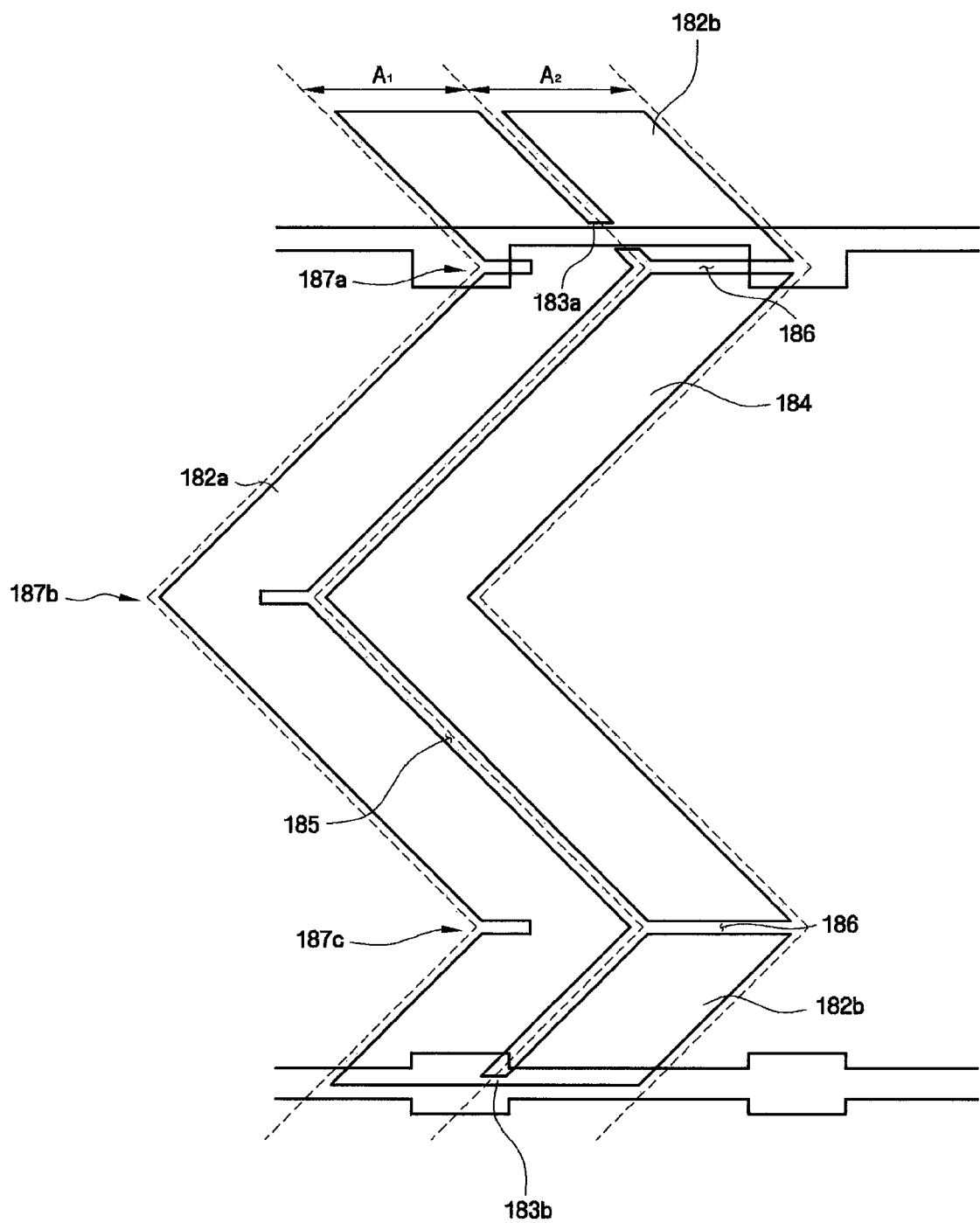
FIG. 1B is a layout illustrating the relationship between a pixel electrode and first and second gate lines illustrated in FIG. 1A.
Figure 2:
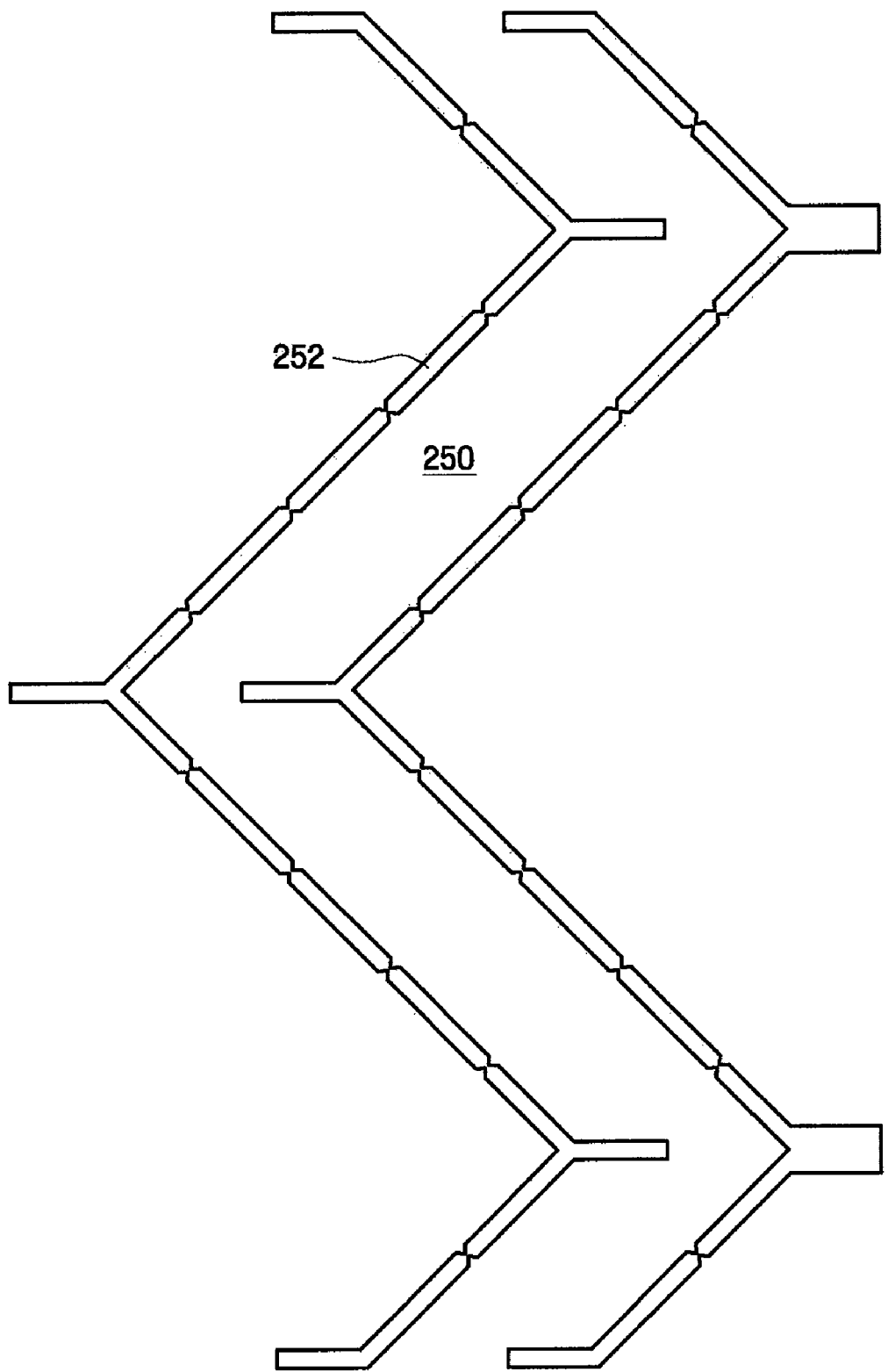
FIG. 2 is a layout of a second display panel according to an embodiment of the present invention.
Figure 3:
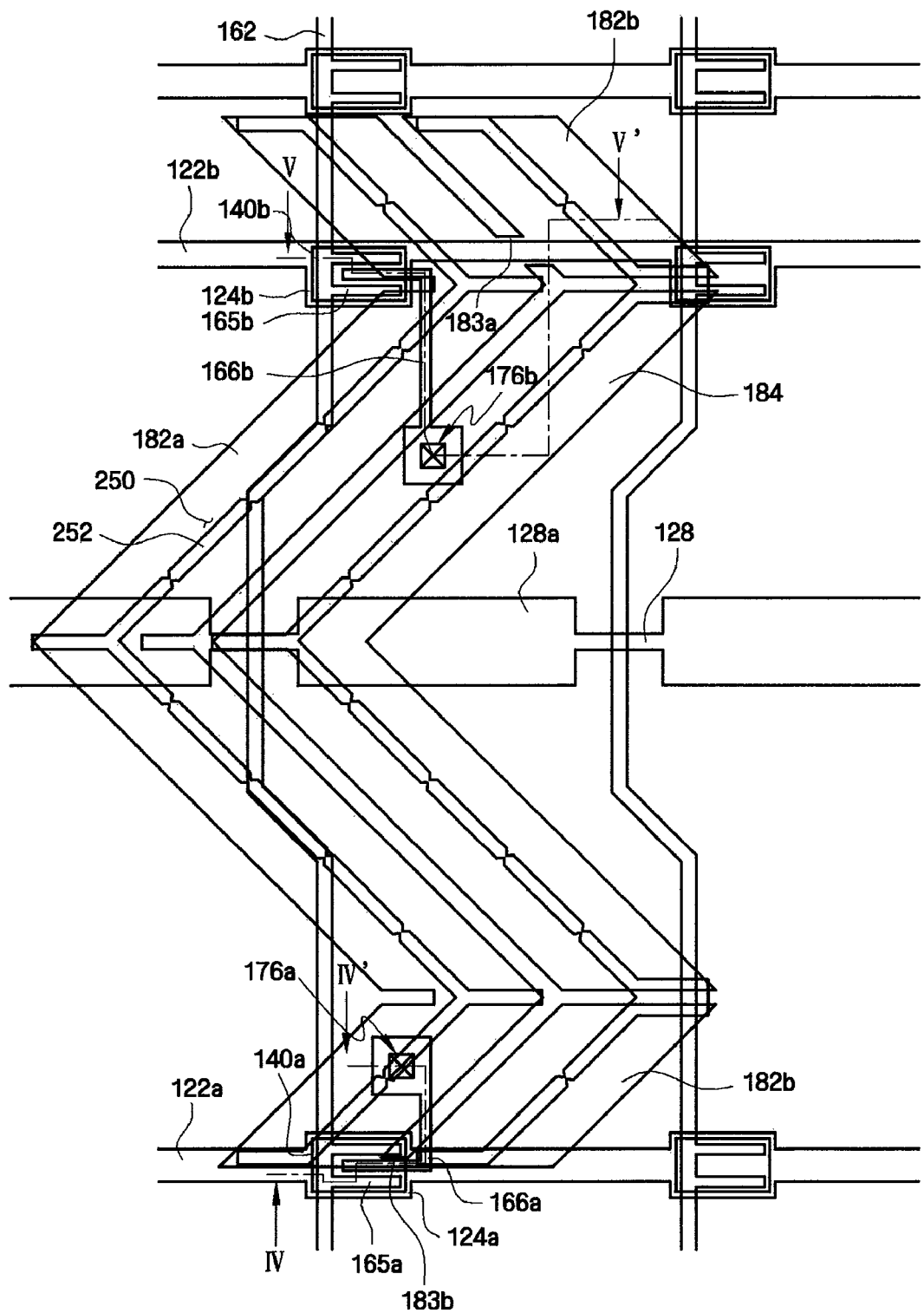
FIG. 3 is a layout of a liquid crystal display (LCD) according to an embodiment of the present invention.
Figure 4:
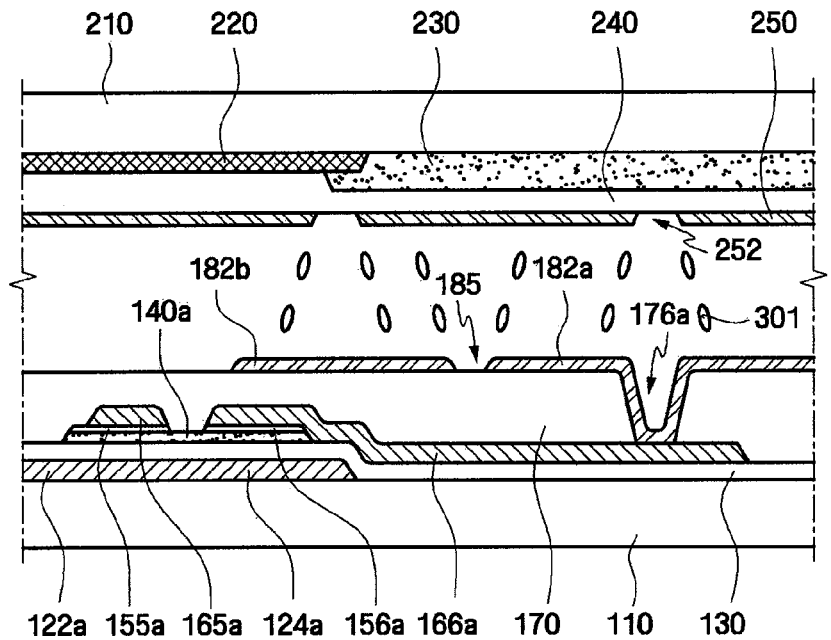
FIG. 4 is a cross-sectional view taken along line IV-IV' of FIG. 3.
Figure 5:
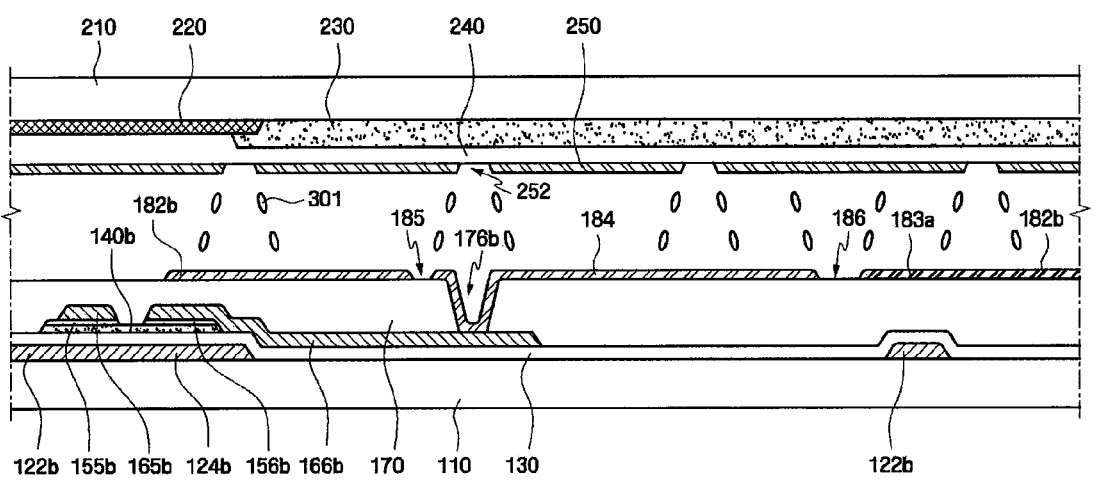
FIG. 5 is a cross-sectional view taken along line V-V' of FIG. 3.

FIG. 1A is a layout of a first display panel according to an embodiment of the present invention, FIG. 1B is a layout illustrating the relationship between a pixel electrode and first and second gate lines illustrated in FIG. 1A, FIG. 2 is a layout of a second display panel according to an embodiment of the present invention, FIG. 3 is a layout of a liquid crystal display (LCD) according to an embodiment of the present invention, FIG. 4 is a cross-sectional view taken along line IV-IV' of FIG. 3, and FIG. 5 is a cross-sectional view taken along line V-V' of FIG. 3.

Referring to FIGS. 4 and 5, a liquid crystal display (LCD) according to an embodiment of the present invention includes a first display panel, a second display panel aligned to face the first display panel, and a liquid crystal layer interposed between the first display panel and the second display panel.

The first display panel will hereinafter be described in further detail with reference to FIGS. 1A and 3 through 5.

Referring to FIGS. 1A and 3 through 5, the first display panel comprises a first insulation substrate 110 as a base substrate. The first insulation substrate 110 is formed of transparent glass or plastic. A first gate line 122a and a second gate line 122b are formed on the first insulation substrate 110 and extend in a first direction, for example, a horizontal direction.

The first gate line 122a is located at the boundary of a pixel, and the second gate line 122b extends in parallel with the first gate line 122a and disposed so as to cross the pixel. The first gate line 122a is partially expanded, thereby forming a first gate electrode 124a. The second gate line 122b is partially expanded, thereby forming a second gate electrode 124b. The first and second gate electrodes 124a and 124b may be formed in various shapes.

A storage electrode line 128 is formed on the first insulation substrate 110 on the same level as the first and second gate lines 122a and 122b. The storage electrode line 128 may be arranged in various forms. For example, referring to FIG. 1, the storage electrode line 128 may be disposed so as to cross the same the pixel and thus divide the pixel into an upper half and a lower half. The storage electrode line 128 may include a storage electrode expansion 128a which corresponds to an expanded portion of the storage electrode line 128. The storage electrode expansion 128a is formed to overlap a first sub-pixel electrode 182a and 182b and a second sub-pixel electrode 184. The first sub-pixel electrode 182a and 182b and the second sub-pixel electrode 184 will be described later in detail.

The first and second gate lines 122a and 122b, the first and second gate electrodes 124a and 124b connected thereto, and the storage electrode line 128 are formed as a single layer made of Al, Ag, Cu, Mo, Cr, Ti, Ta, or alloys thereof, or as a multi-layered structure. A concrete example of the multi-layered structure is a double layered structure consisting of a Mo lower layer and an Al upper layer.

A gate insulation layer 130 is formed of silicon nitride or silicon oxide on the first gate line 122a, the second gate line 122b, and the storage electrode line 128. A first semiconductor layer 140a and a second semiconductor layer 140b are formed of amorphous hydrogenated silicon on the gate insulation layer 130. The first semiconductor layer 140a overlaps the first gate electrode 124a, and the second semiconductor layer 140b overlaps the second gate electrode 124b.

A plurality of data interconnections are formed on the first and second semiconductor layers 140a and 140b or on the gate insulation layer 130. The data interconnections include a data line 162 which extends in a second direction, e.g., a vertical direction, a first source electrode 165a which branches off from the data line 162 toward the first gate electrode 124a, a first drain electrode 166a which is separated from the first source electrode 165a and faces the first source electrode 165a, a second source electrode 165b which branches off from the data line 162 toward the second gate electrode 124b, and a second drain electrode 166b which is separated from the second source electrode 165b and faces the second source electrode 165b. The data line 162 may be formed as a straight line that extends in the vertical direction or may be formed as a zigzag line that penetrates into a middle portion of the pixel, as illustrated in FIG. 1A. The first source electrode 165a and the first drain electrode 166a at least partially overlap the first gate electrode 124a and the first semiconductor layer 140a, and the second source electrode 165b and the second drain electrode 166b at least partially overlap the second gate electrode 124b and the second semiconductor layer 140b.

The data interconnections 162, 165a, 166a, 165b and 166b are formed as a single layer made of Al, Ag, Cu, Mo, Cr, Ti, Ta, or alloys thereof, or as a multi-layered structure. A concrete example of the multi-layered structure is a triple layered structure consisting of a Mo lower layer, an Al intermediate layer and a Mo upper layer.

The first gate electrode 124a, the first source electrode 165a, and the first drain electrode 166a form a first thin film transistor (TFT) having the first semiconductor layer 140a as a channel portion, and the second gate electrode 124b, the second source electrode 165b, and the second drain electrode 166b form a second TFT having the second semiconductor layer 140b as a channel portion. A plurality of resistive contact layers 155a, 156a, 155b, and 156b are made of hydrogenated amorphous silicon doped with high concentration n+ type impurity, and are respectively interposed between the first semiconductor layer 140a and the first source electrode 165a, between the first semiconductor layer 140a and the first drain electrode 166a, between the second semiconductor layer 140b and the second source electrode 165b, and between the second semiconductor layer 140b and the second drain electrode 166b, thereby reducing the contact resistance between the first semiconductor layer 140a and the first source electrode 165a and the first drain electrode 166a and between the second semiconductor layer 140b and the second source electrode 165b and the second drain electrode 166b.

A passivation layer 170 is formed on the data interconnections 162, 165a, 166a, 165b, and 166b. The passivation layer 170 may be comprised of a single layer that is formed of an inorganic material such as silicon nitride or an organic dielectric material, or a stack of two or more layers made of these materials. A plurality of contact holes 176a and 176b are formed in the passivation layer 170 so that the first drain electrode 166a and the second drain electrode 166b are at least partially exposed through the contact holes 176a and 176b, respectively.

A pixel electrode comprised of a first sub-pixel electrode 182a and 182b and a second sub-pixel electrode 184 is formed of a transparent conductive material such as ITO or IZO on the passivation layer 170.

The pixel electrode extends generally in a zigzag, chevron-shaped fashion between the first gate line 122a and the second gate line 122b at a predetermined inclination to the first and second gate lines 122a and 122b. The lateral sides of the pixel electrode may form substantially the same shape and extend in parallel with each other. The upper and lower ends of the pixel electrode may extend in parallel with the first and second gate electrodes 124a and 124b.

The pixel electrode includes one or more bends, e.g., first, second, and third bends 187a, 187b, and 187c, as illustrated in FIGS. 1A and 1B. Referring to FIGS. 1A and 1B, the pixel electrode extends from upper side to the first bend 187a at a negative inclination to the first and second gate line 122a and 122b, e.g., at an inclination of −45°. The pixel electrode extends between the first bend 187a and the second bend 187b at a positive inclination to the first and second gate line 122a and 122b, e.g., at an inclination of 45°. The first bend 187a is disposed under the second gate line 122b, and is not overlapped by the second gate line 122b. The pixel electrode extends between the second bend 187b and the third bend 187c at the negative inclination to the first and second gate lines 122a and 122b, and extends between the third bend 187c and the first gate line 122a at the positive inclination to the first and second gate lines 122a and 122b. The second bend 187b is located in the middle of the pixel electrode and horizontally divides the pixel electrode into the upper half and the lower half. The upper and lower halves of the pixel electrode are symmetrical with respect to the second bend 187b.

Referring to FIG. 1B, the pixel electrode may be divided into two areas, i.e., a first area A1 and a second area A2, in the direction in which the pixel electrode extends. The boundary between the first area A1 and the second area A2 may form the same shape as the lateral sides of the pixel electrode, i.e., a zigzag shape. If the lateral sides of the pixel electrode extend in parallel with each other, then the boundary between the first area A1 and the second area A2 may extend in parallel with the lateral sides of the pixel electrode.

The pixel electrode includes the first sub-pixel electrode 182a and 182b and the second sub-pixel electrode 184 which are electrically disconnected from each other.

The first sub-pixel electrode 182a and 182b is electrically connected to the first drain electrode 166a via the contact hole 176a, and is driven by the first TFT. On the other hand, the second sub-pixel electrode 184 is electrically connected to the second drain electrode 166b via the contact hole 176b, and is driven by the second TFT. Accordingly, the first sub-pixel electrode 182a and 182b and the sub-pixel electrode 184 can be supplied with different pixel voltages, thereby preventing gamma curve distortions and improving lateral visibility.

The structures of the first sub-pixel electrode 182a and 182b and the sub-pixel electrode 184 will hereinafter be described in further detail with reference to FIGS. 1A and 1B.

Referring to FIG. 1B, the first sub-pixel electrode 182a and 182b comprises the entire first area A1, and upper and lower portions of the second area A2.

The second sub-pixel electrode 184 comprises the remaining middle portion of the second area A2. The second sub-pixel electrode 184 adjoins a first portion 182a of the first sub-pixel electrode and is separated from the first portion 182a, thereby forming a slanted gap 185. The slanted gap 185 is located along the boundary between the first area A1 and the second area A2. The second sub-pixel electrode 184 adjoins upper and lower second portions 182b of the first sub-pixel electrode, and is separated from each of the upper and lower second portions 182b with horizontal gaps 186.

The lower side of the upper second portion 182b of the first sub-pixel electrode and the upper side of the second sub-pixel electrode 184 may be in parallel with the second gate line 122b, and the upper side of the lower second portion 182b of the first sub-pixel electrode and the lower side of the second sub-pixel electrode 184 may be in parallel with the first gate line 122a. A horizontal gap 186 may also be formed at the second bend 187b of the first sub-pixel electrode. In other words, according to the present embodiment, a horizontal gap 186 may be formed at each of the first through third bends 187a through 187c.

The slanted gap 185 and the horizontal gaps 186 form a fringe field, thereby contributing to defining of domains in the liquid crystal layer.

The slanted gap 185 is connected to the horizontal gaps 186 which are respectively formed at the first through third bends 187a through 187c. Then, the slanted gap 185 further extends upward from the first bend 187a and downward from the third bend 187c and thus separates the first portion 182a of the first sub-pixel electrode 182 from the upper and lower second portions 182b of the first sub-pixel electrode. First and second connection electrodes 183a and 183b are respectively provided between the first portion 182a and the upper second portion 182b of the first sub-pixel electrode and between the first portion 182a and the lower second portion 182b of the first sub-pixel electrode, so that the first area 182a of the first sub-pixel electrode is electrically connected to the upper and lower second portions 182b of the first sub-pixel electrode. Accordingly, the slanted gap 185 is discontinuous at the upper and lower sides of the first sub-pixel electrode where the first and second connection electrodes 183a and 183b are respectively formed.

The first connection electrode 183a, which connects the first portion 182a and the upper second portion 182b of the first sub-pixel electrode, overlaps the second gate line 122b. The first connection electrode 183a may completely or partially cover the second gate line 122b. The first connection electrode 183a blocks an electric field generated by the second gate line 122b. The first connection electrode 183a will be described later in further detail.

The second connection electrode 183b, which connects the first portion 182a and the lower second portion 182b of the first sub-pixel electrode, partially covers the first gate line 122a. Alternatively, the second connection electrode 183b may be formed without regard to the location of the first gate line 122a.

An alignment layer (not shown) may be formed on the pixel electrode. The alignment layer may be a vertical alignment layer which initially aligns liquid crystal molecules 301 so that the longitudinal axes of the liquid crystal molecules 301 are aligned in a substantially vertical direction.

The second display panel will hereinafter be described in further detail with reference to FIGS. 2 through 5.

Referring to FIGS. 2 through 5, the second display panel comprises a second insulation substrate 210 as a base substrate, and the second insulation substrate 210, like the first insulation substrate 110, is formed of transparent glass or plastic. A black matrix 220 is formed on the second insulation substrate 210. The black matrix 220 overlaps the first gate line 122a and the data line 162 of the first display panel. A color filter 230 is formed in an area that is surrounded by the black matrix 220. The color filter 230 is aligned to overlap the pixel electrode of the first display panel.

An overcoat layer 240 is formed on the black matrix 220 and the color filter 230 to planarize the step difference between the black matrix 220 and the color filter 230.

A common electrode 250 is formed of a transparent conductive material such as ITO or IZO on the overcoat layer 240. The common electrode 250 is formed on the front surface of the second display panel without regard to each pixel. Each pixel includes a number of cutouts 252. Referring to FIGS. 2 and 3, each pixel may include two cutouts 252. Each of the cutouts 252 includes a slanted portion that resembles the slanted gap 185, and a plurality of horizontal portions that resemble the horizontal gaps 186. The cutouts 252 may be formed such that, when the first display panel and the second display panel are aligned to face each other, the slanted gap 185 is interposed between the slanted portions of the cutouts 252 in parallel with the slanted portions of the cutouts 252 and that the horizontal portions of the cutouts 252 are disposed so as to be level with the respective horizontal gaps 186 of the first display panel, wherein the horizontal portions of the cutouts 252 may partially overlap the respective horizontal gaps 186.

The cutouts 252 of the common electrode 250 form a fringe field together with the gaps 185 and 186 of the first display panel, thereby contributing to the defining of domains in the liquid crystal layer, each domain indicating the direction of uniformly oriented liquid crystal molecules 301.

An alignment layer (not shown) may be formed on the common electrode 250. The alignment layer of the second display panel, like the alignment layer of the first display panel, may be a vertical alignment layer.

Referring to FIGS. 4 and 5, a liquid crystal layer consisting of the liquid crystal molecules 301 is interposed between the first display panel and the second display panel. The liquid crystal molecules 301 have, for example, negative dielectric anisotropy, and may be initially aligned in a vertical direction with respect to the first and second display panels when no electric field is applied thereto. Liquid crystal molecules 301 belonging to the same domain may exhibit a uniform orientation, wherein each domain is defined by the gaps 185 and 186 of the first display panel and the cutouts 252 of the second display panel. In other words, as shown in FIGS. 4 and 5, the liquid crystal molecules 301 may have different rotation directions according to their locations relative to the gaps 185 and 186 and the cutouts 252.

Figure 6:
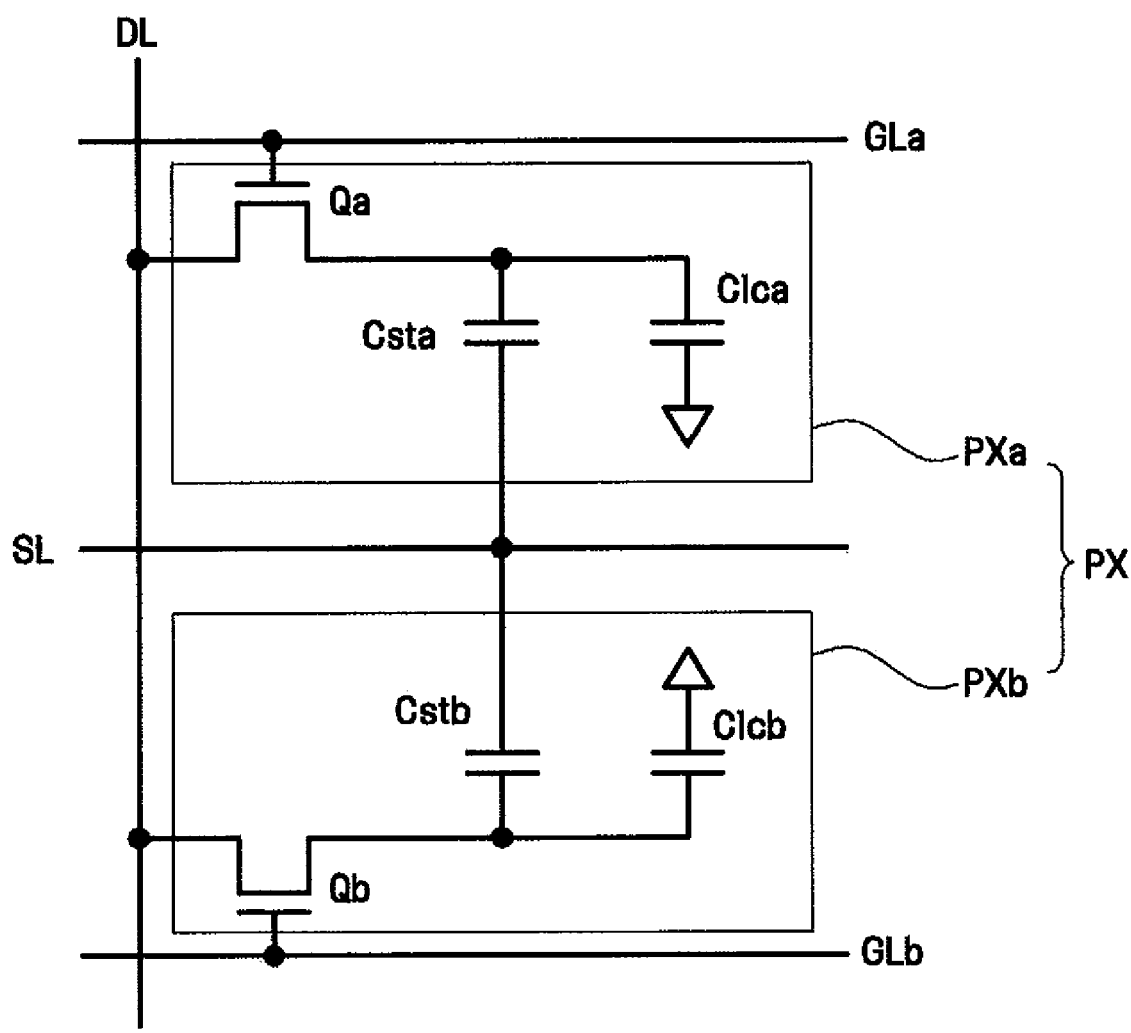
FIG. 6 is a circuit diagram of the LCD illustrated in FIG. 3.

A circuit diagram of the aforementioned LCD is illustrated in FIG. 6. Referring to FIG. 6, GLa, GLb, DL, and SL respectively indicate a first gate line, a second gate line, a data line, and a storage electrode line. PX, PXa, and PXb respectively indicate a pixel electrode, a first sub-pixel electrode, and a second sub-pixel electrode. Qa and Qb respectively indicate a first TFT and a second TFT. Clca indicates a liquid crystal capacitor that is formed between the first sub-pixel electrode Pxa and the storage electrode line SL. Clcb indicates a liquid crystal capacitor that is formed between the second sub-pixel electrode PXb and a common electrode. Cstb indicates a storage capacitor that is formed between the second sub-pixel electrode PXb and the storage electrode line SL.

Referring to FIG. 6, when a gate-on voltage of, for example, about 20 V, is applied to the first gate line GLa, the first TFT Qa is turned on. Then, a first sub-data voltage is applied to the first sub-pixel electrode PXa, and at the same time, the liquid crystal capacitor Clca and the storage capacitor Csta are charged with a first sub-pixel voltage. Thereafter, when a gate-off voltage of, for example, about −7 V, is applied to the first gate line GLa, the first TFT Qa is turned off. Then, a liquid crystal layer between the first sub-pixel electrode PXa and the common electrode is charged with the first sub-pixel voltage by the liquid crystal capacitor Clca and the storage capacitor Csta, and the resulting voltage of the liquid crystal layer is maintained for one frame period. The alignment angle of liquid crystal molecules in a liquid crystal layer changes according to the first sub-pixel voltage supplied to the liquid crystal layer, thereby altering the phase of light transmitted through the liquid crystal layer and the light transmittance of a polarization plate.

Thereafter, when a gate-on voltage of, for example, about 20 V, is applied to the second gate line GLb, the second TFT Qb is turned on. Then, a second sub-data voltage is applied to the second sub-pixel electrode PXb, and at the same time, the liquid crystal capacitor Clcb and the storage capacitor Csta are charged with a second sub-pixel voltage. Thereafter, when a gate-off voltage of, for example, about −7 V, is applied to the second gate line GLb, the second TFT Qb is turned off. Then, a liquid crystal layer between the second sub-pixel electrode PXb and the common electrode is charged with the second sub-pixel voltage by the liquid crystal capacitor Clcb and the storage capacitor Csta, and the resulting voltage of the liquid crystal layer is maintained for one frame period. The alignment angle of liquid crystal molecules in a liquid crystal layer changes according to the second sub-pixel voltage supplied to the liquid crystal layer, thereby altering the phase of light transmitted through the liquid crystal layer and the light transmittance of a polarization plate.

In short, the first and second sub-pixel electrodes PXa and PXb that constitute a single pixel electrode, i.e., the pixel electrode PX, are driven by different TFTs, i.e., the first and second TFTs Qa and Qb, thereby charging the first and second sub-pixel electrodes PXa and PXb with different voltages. For example, the first sub-pixel electrode PXa may be charged with a relatively low voltage, and the second sub-pixel electrode PXb may be charged with a relatively high voltage. The light transmittance of the pixel electrode PX may be determined as the combination of a pair of liquid crystal transmittances respectively determined by the first and second sub-pixel electrodes PXa and PXb. In other words, a gamma curve of a pixel is represented by the combination of two gamma curves, thereby preventing gamma curve distortions and improving lateral visibility.

Referring to FIGS. 1A and 3 through 5, during one frame period, the second gate line 122b is continuously supplied with a gate-off voltage, except when the second TFT is turned on. The gate-off voltage is about −7 V, while the first sub-pixel electrode and the second sub-pixel electrode 184 are supplied with a voltage of, for example, 0-15 V, which is much higher than the gate-off voltage. In the meantime, referring to FIGS. 1A and 1B, the second gate line 122b is disposed so as to cross the pixel. Since the slanted gap 185 is disposed over the pixel, a liquid layer may be affected by the gate-off voltage applied to the second gate line 122b when the second gate line 122b is exposed through the slanted gap 185. In other words, a portion of the liquid crystal layer corresponding to a portion of the second gate line 122b exposed through the slanted gap 185 is controlled not by a voltage applied to the first sub-pixel electrode or the second sub-pixel electrode 184 but by an electric field generated by the second gate line 122b. Thus, the portion of the liquid crystal layer corresponding to the exposed portion of the second gate line 122b may be viewed as light leakage in an LCD when the LCD is initially driven.

Therefore, according to the present embodiment, the first connection electrode 183a is isthmus shaped and formed to connect the first portion 182a of the first sub-pixel electrode and the upper second portion 182b of the first sub-pixel electrode, as illustrated in FIGS. 1A and 1B. In other words, the second gate line 122b is covered by the first connection electrode 183a. Thus, the alignment angle of the liquid crystal layer is controlled not by an electric field generated by the second gate line 122b but by an electric field generated by the first connection electrode 183a. Since the first connection electrode 183a has the same electric potential as the first sub-pixel electrode, part of the liquid crystal layer that overlaps the second gate line 122b is likely to have the same alignment angle as part of the liquid crystal that overlaps the first sub-pixel electrode. Accordingly, it is possible to prevent light leakage.

Given all this, the first connection electrode 183a may be formed to completely cover the second gate line 122b. However, the first connection electrode 183a still can block an electric field generated by the second gate line 122b even when being formed to partially cover the second gate line 122b.

LCDs according to other embodiments of the present invention will hereinafter be described in detail. These LCDs have the same second display panel layout as that illustrated in FIG. 2, and have the same cross-sectional structure as that illustrated in FIG. 4. In the drawings, like reference numerals represent like elements, and thus, detailed descriptions thereof will be omitted.

Figure 7A:
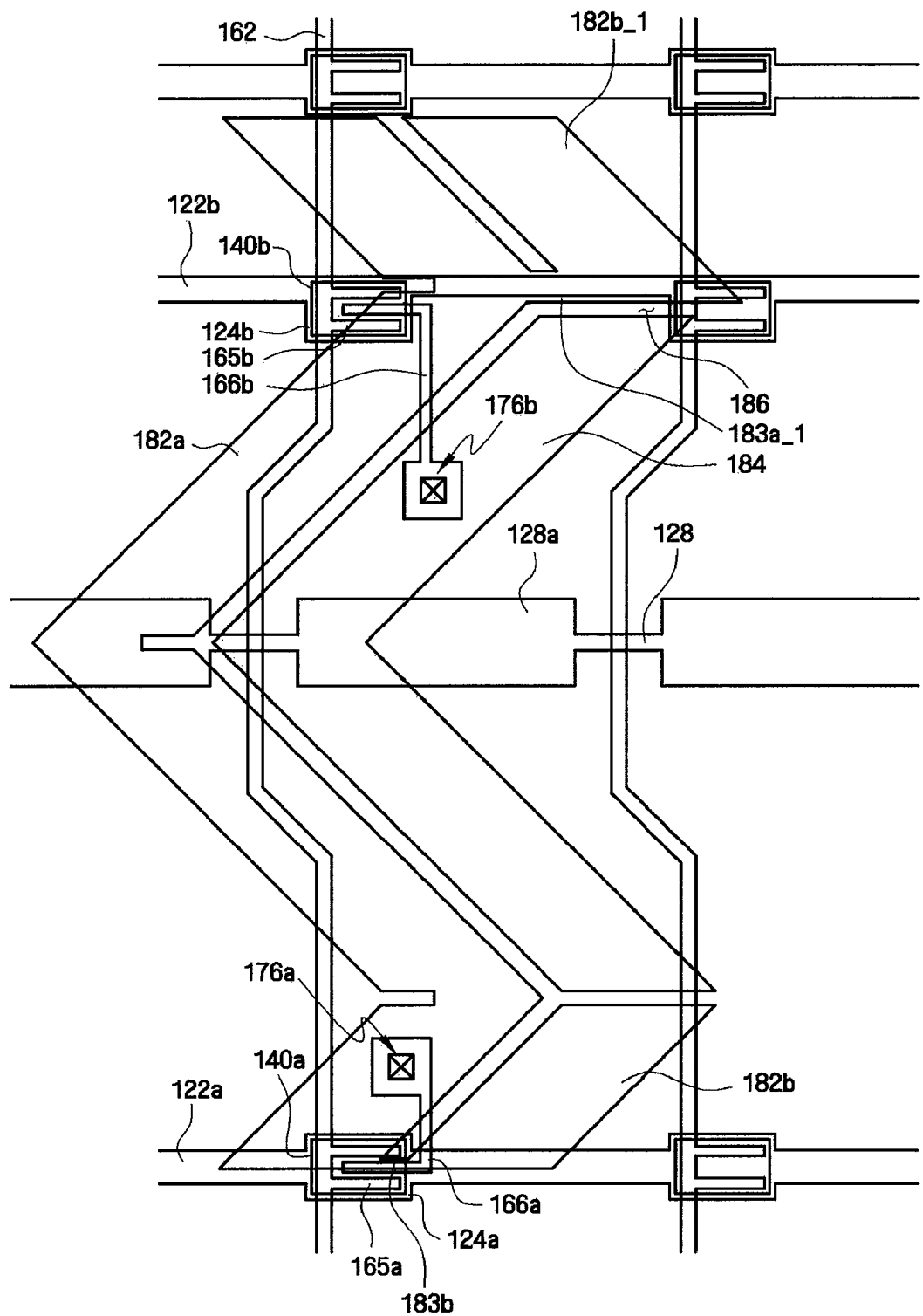
FIG. 7A is a layout of a first display panel according to another embodiment of the present invention.
Figure 7B:
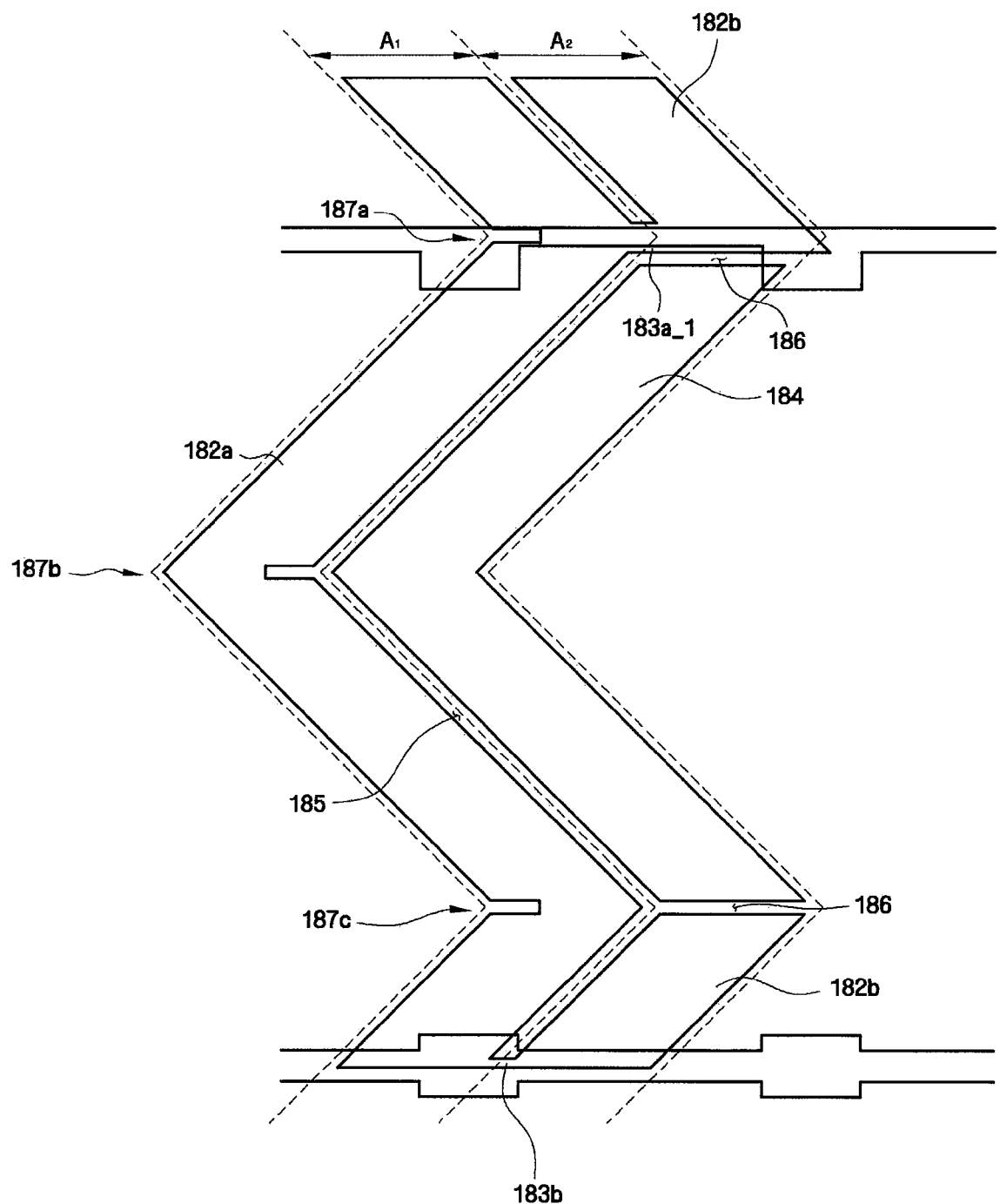
FIG. 7B is a layout illustrating the relationship between a pixel electrode and first and second gate lines illustrated in FIG. 7A.
Figure 8:
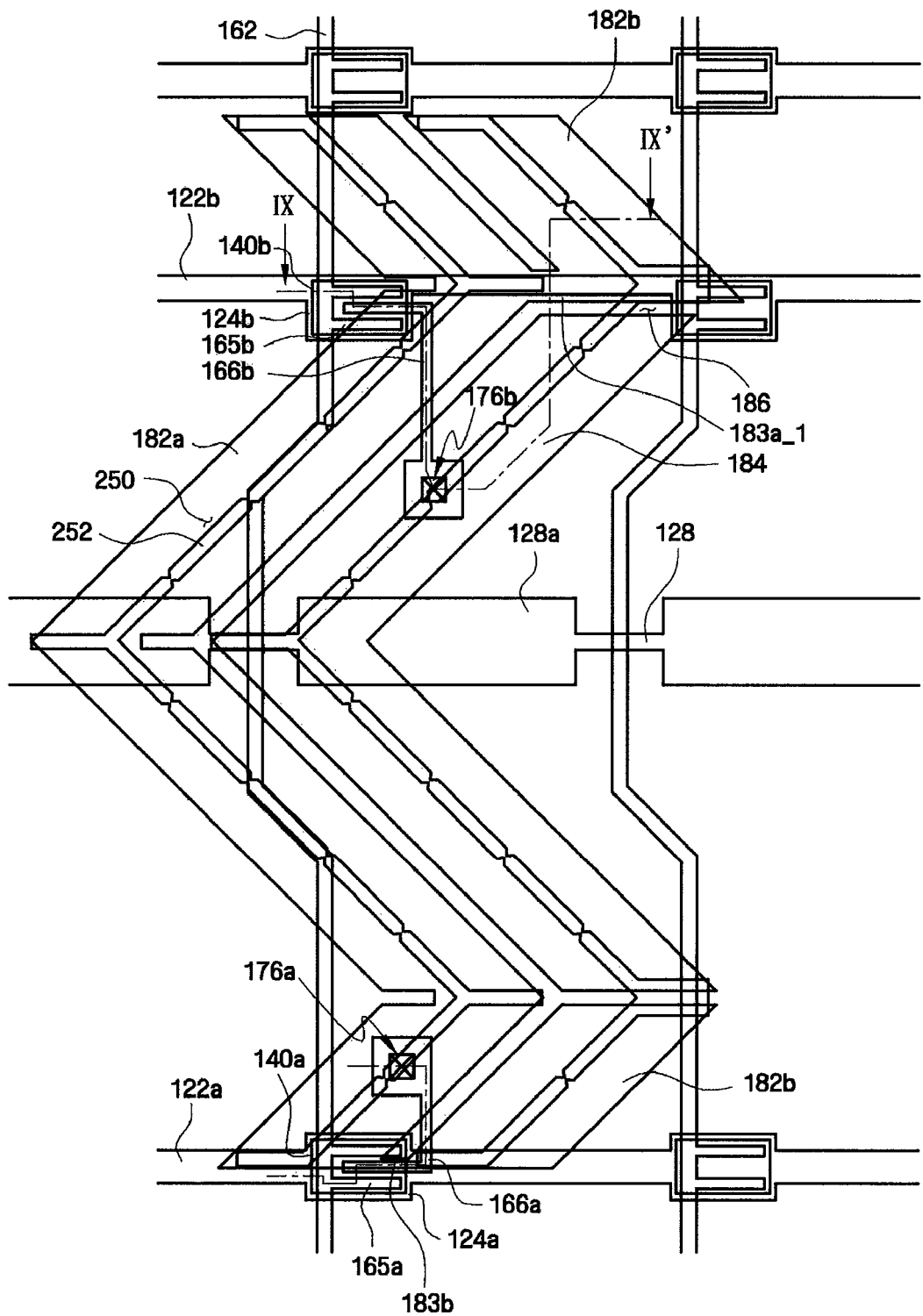
FIG. 8 is a layout of an LCD according to another embodiment of the present invention.
Figure 9:
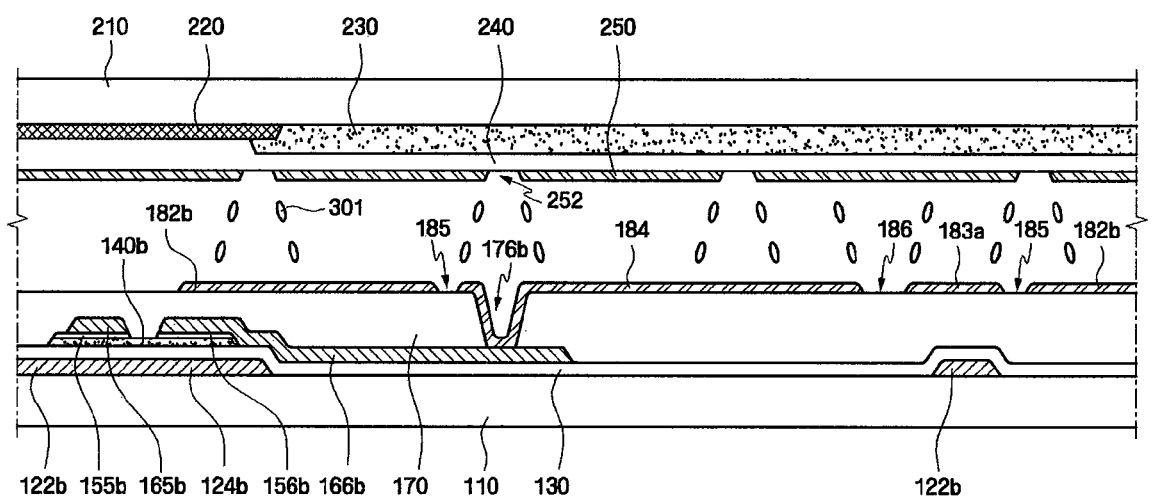
FIG. 9 is a cross-sectional view taken along line IX-IX' of FIG. 8.

FIGS. 7A through 9 illustrate an LCD according to another embodiment of the present invention. FIG. 7A is a layout of a first display panel according to another embodiment of the present invention, FIG. 7B is a layout illustrating the relationship between a pixel electrode and first and second gate lines illustrated in FIG. 7A, FIG. 8 is a layout of an LCD according to another embodiment of the present invention, and FIG. 9 is a cross-sectional view taken along line IX-IX' of FIG. 8.

Referring to FIGS. 7A through 9, a second gate line 122b of a first display panel of the LCD is disposed so as to cross a pixel by overlapping a first bend 187a. The upper side of a second sub-pixel electrode 184 is located lower in a pixel than the upper side of the second sub-pixel electrode 184 of the LCD illustrated in FIGS. 1A through 6.

A first portion 182a and an upper second portion 182b_1 of a first sub-pixel electrode are connected by a first connection electrode 183a_1 which overlaps the second gate line 122b. The lower side of the first connection electrode 183a_1 is substantially level with the lower side of the upper second portion 182b_1 of the first sub-pixel electrode. In other words, the inclination angle of a slanted gap 185 changes from negative to positive at the first connection electrode 183a_1. Also, a horizontal gap 186 that is formed between the upper second portion 182b and the second sub-pixel electrode 184 is located below the second gate line 122b. The second gate line 122b is covered by the first portion 182a and the upper second portion 182b_1 of the first sub-pixel electrode and the first connection electrode 183a_1.

According to the present embodiment, the second gate line 122b extends by overlapping the first bend 187a, the upper side of the second sub-pixel electrode 184 is located lower in the pixel than the upper side of the second sub-pixel electrode 184 of the LCD illustrated in FIGS. 1A through 6, and the horizontal gap 186 that is formed between the upper second portion 182b_1 and the second sub-pixel electrode 184 does not overlap the second gate line 122b. Therefore, according to the present embodiment, the first connection electrode 183a_1 connects the first portion 182a and the upper second portion 182b_1 of the first sub-pixel electrode and covers the second gate line 122b, thereby preventing electric field distortions and light leakage that may occur if the second gate line 122b is exposed.

Figure 10A:
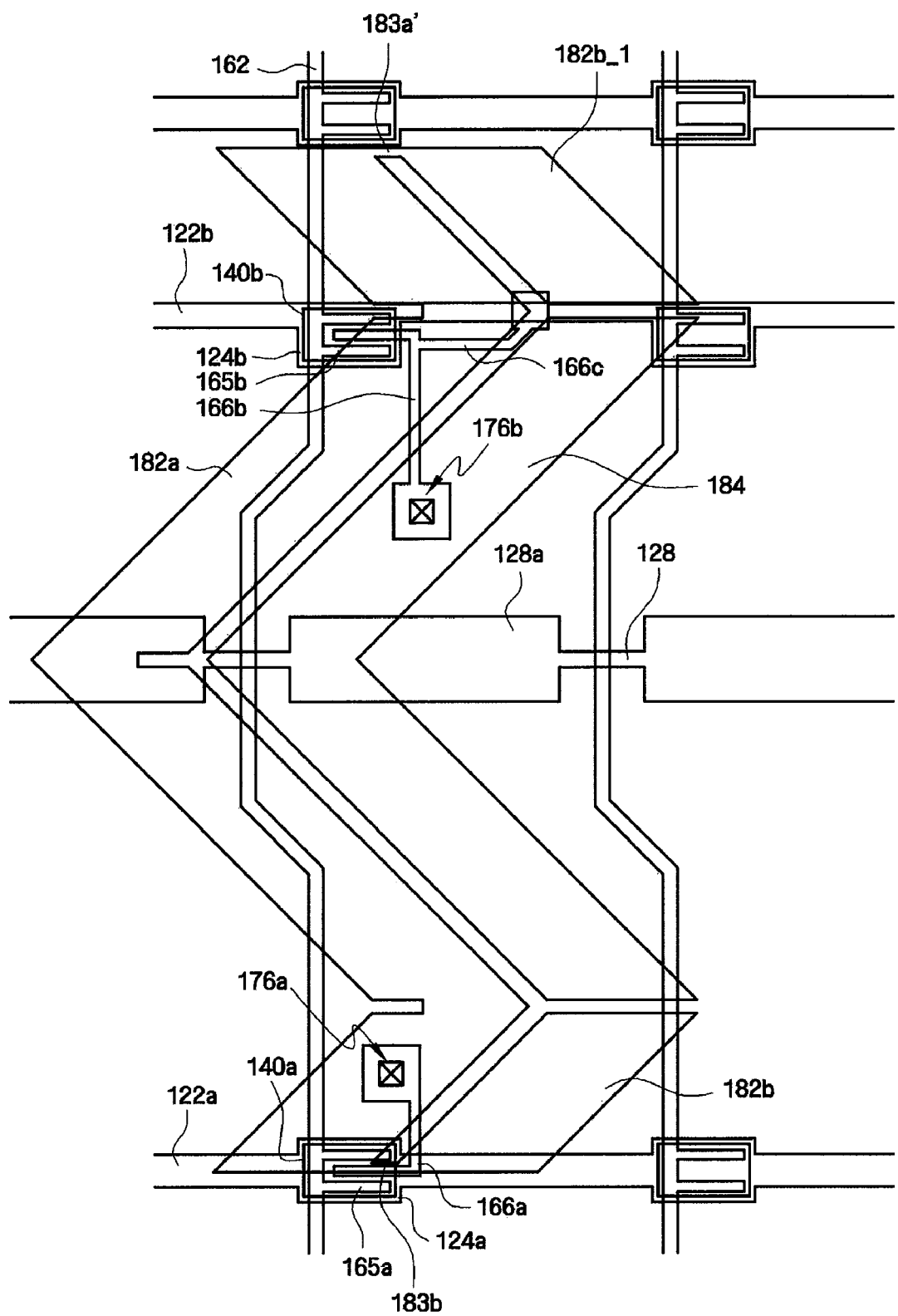
FIG. 10A is a layout of a first display panel according to another embodiment of the present invention.
Figure 10B:
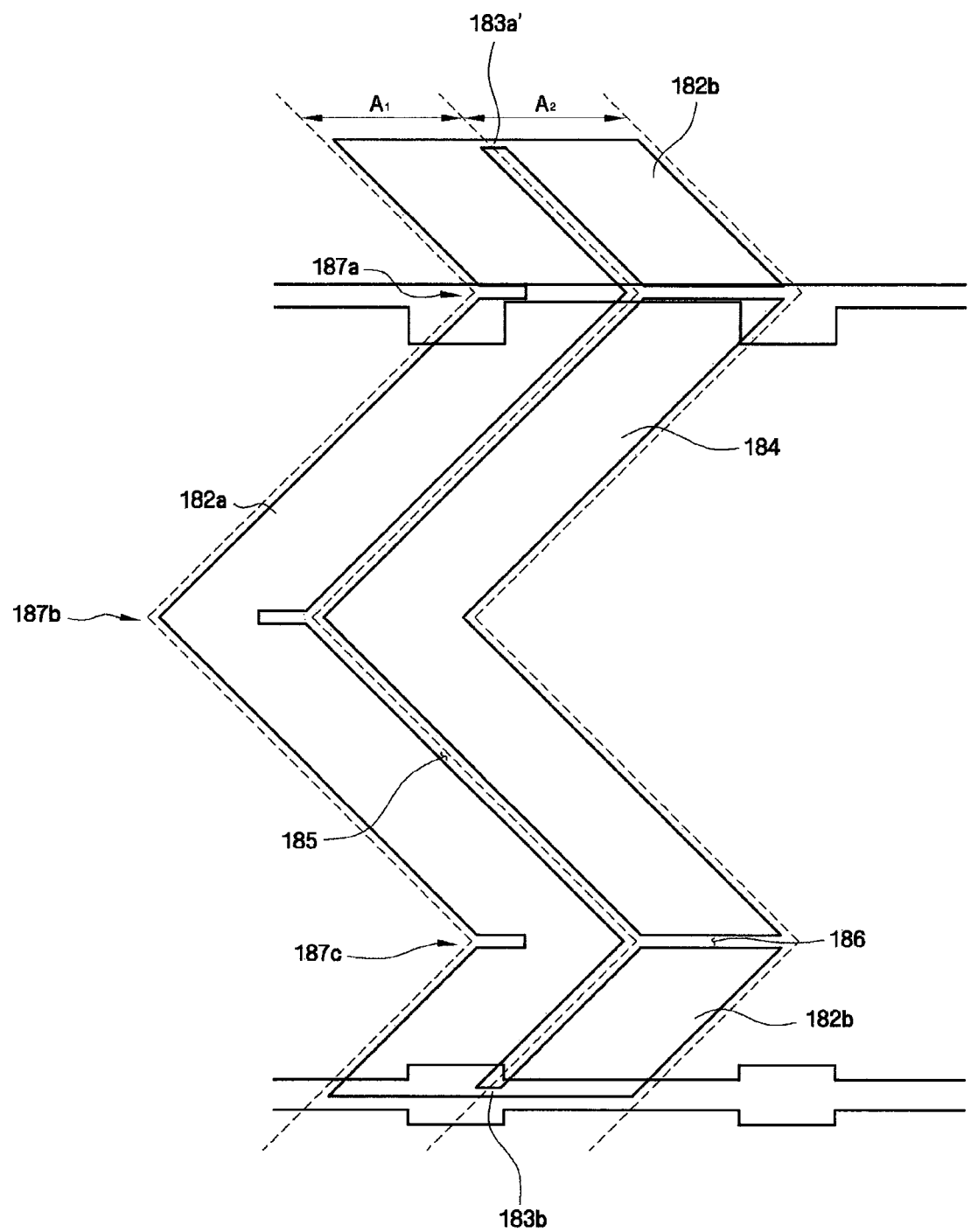
FIG. 10B is a layout illustrating the relationship between a pixel electrode and first and second gate lines illustrated in FIG. 10A.
Figure 11:
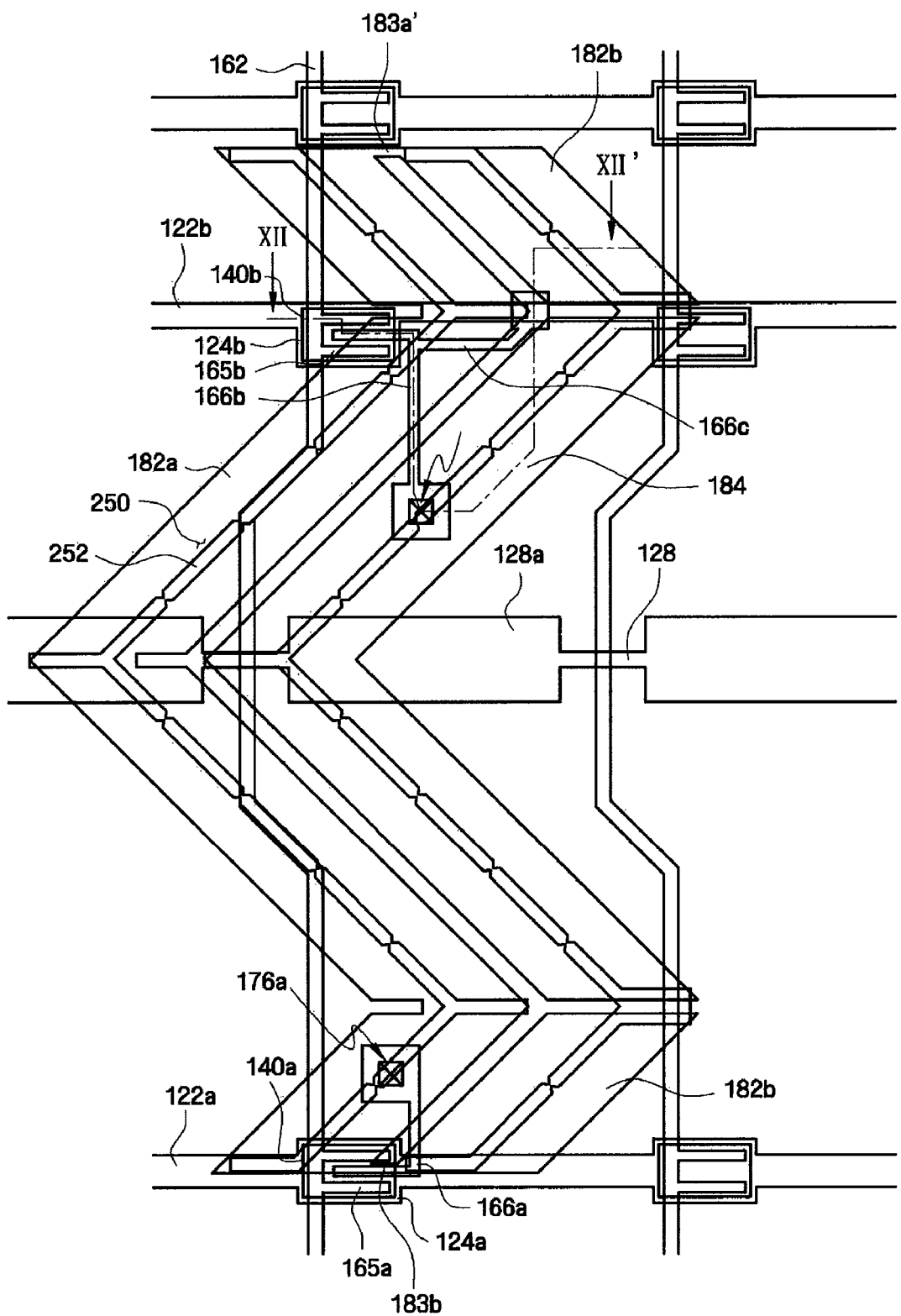
FIG. 11 is a layout of an LCD according to another embodiment of the present invention.
Figure 12:
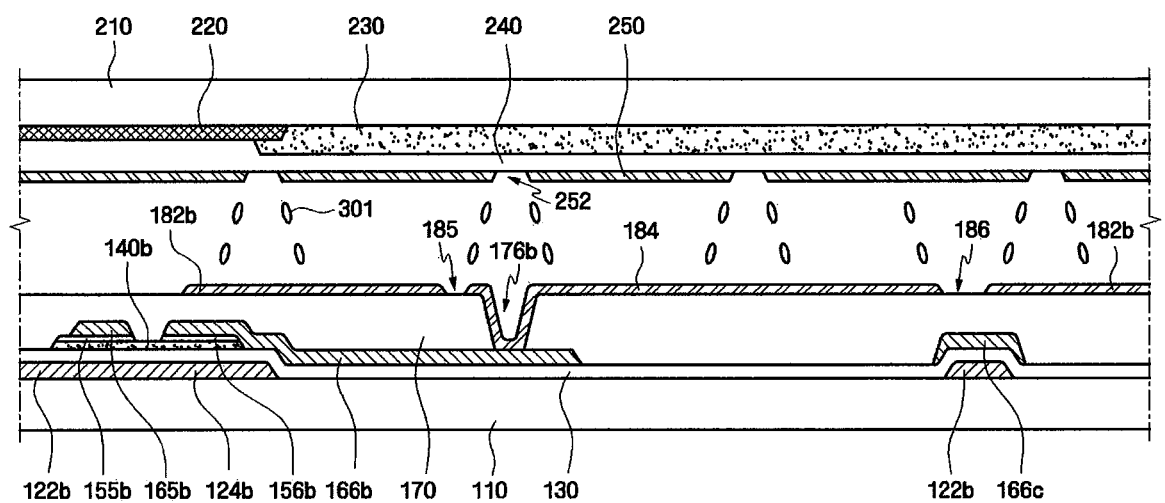
FIG. 12 is a cross-sectional view taken along line XII-XII' of FIG. 11.

FIGS. 10A through 12 illustrate an LCD according to another embodiment of the present invention. FIG. 10A is a layout of a first display panel according to another embodiment of the present invention, FIG. 10B is a layout illustrating the relationship between a pixel electrode and first and second gate lines illustrated in FIG. 10A, FIG. 11 is a layout of an LCD according to another embodiment of the present invention, and FIG. 12 is a cross-sectional view taken along line XII-XII' of FIG. 11.

Referring to FIGS. 10A through 12, a second gate line 122b of a first display panel of the LCD, like the second gate line 122b of the LCD illustrated in FIGS. 7A through 9, is disposed so as to cross a pixel by overlapping a first bend 187a, and a first sub-pixel electrode and a second sub-pixel electrode 184 have the same shapes as their respective counterparts in the LCD illustrated in FIGS. 1A through 6. A first connection electrode 183a' is located above the first sub-pixel electrode and the second sub-pixel electrode 184 and connects a first portion 182a and an upper second portion 182b of the first sub-pixel electrode. A slanted gap 185 crosses and overlaps the second gate line 122b.

According to the present embodiment, the LCD also includes a third drain electrode 166c which covers part of the second gate line 122b that overlaps the slanted gap 185. The third drain electrode 166c branches off from a second drain electrode 166b and is expanded in the overlapping area of the second gate line 122b and the slanted gap 185. In other words, the third drain electrode 166c covers part of the second gate line 122b that is exposed through the slanted gap 185, thereby blocking an electric field generated by the second gate line 122b. A portion of a liquid crystal layer that corresponds to the overlapping area of the second gate line 122b and the slanted gap 185 is affected by an electric field generated by the third drain electrode 166c. Since the second drain electrode 166b has the same electric potential as the second sub-pixel electrode 184 and the third drain electrode 166c, which is connected to the second drain electrode 166b, also has the same electric potential as the second sub-pixel electrode 184, the portion of the liquid crystal layer corresponding to the overlapping area of the second gate line 122b and the slanted gap 185 may have the same alignment angle as other portions of the liquid crystal layer that are located over the second sub-pixel electrode 184. Accordingly, it is possible to prevent electric field distortions and light leakage.

Figure 13A:
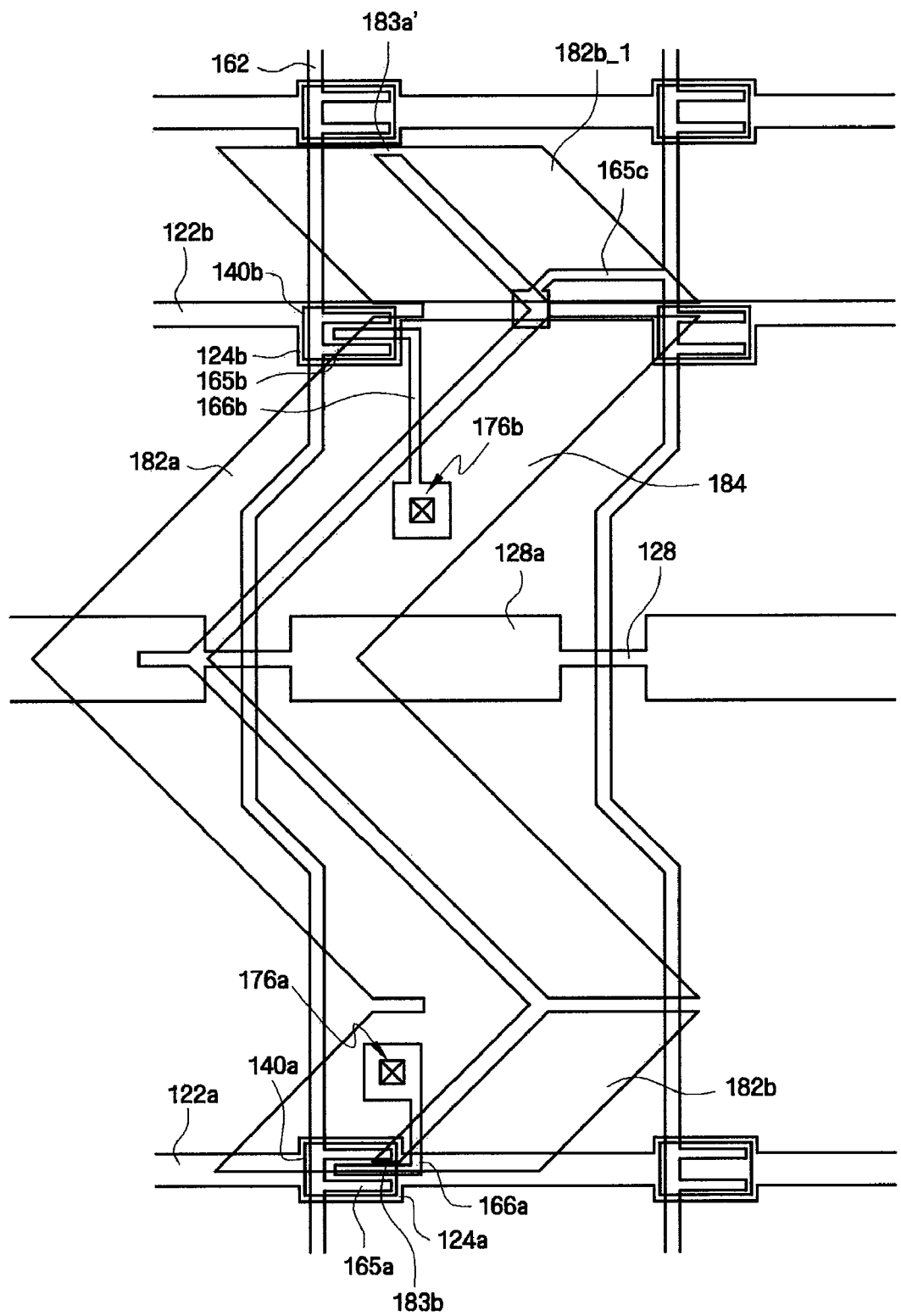
FIG. 13A is a layout of a first display panel according to another embodiment of the present invention.
Figure 13B:
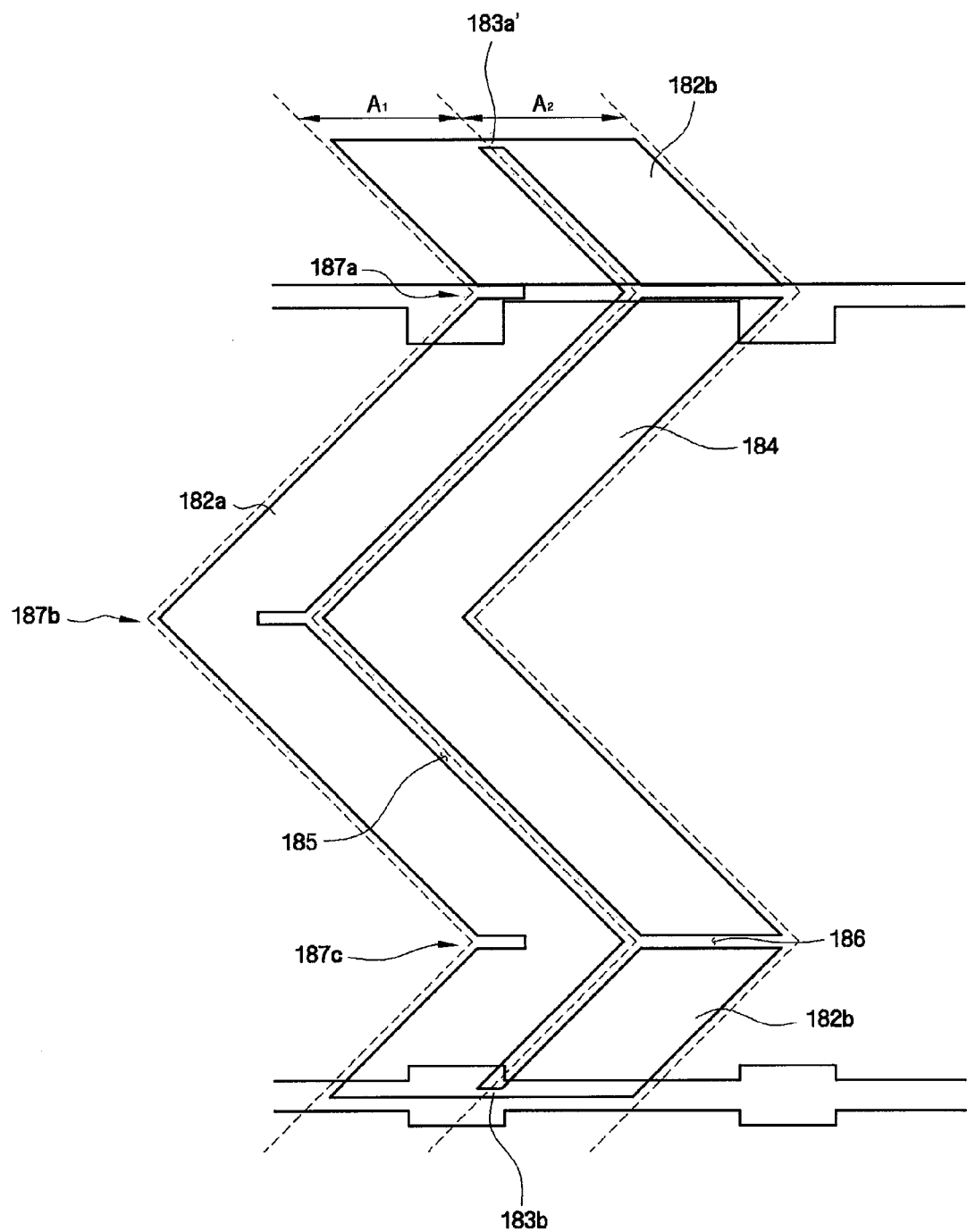
FIG. 13B is a layout illustrating the relationship between a pixel electrode and first and second gate lines illustrated in FIG. 13A.
Figure 14:
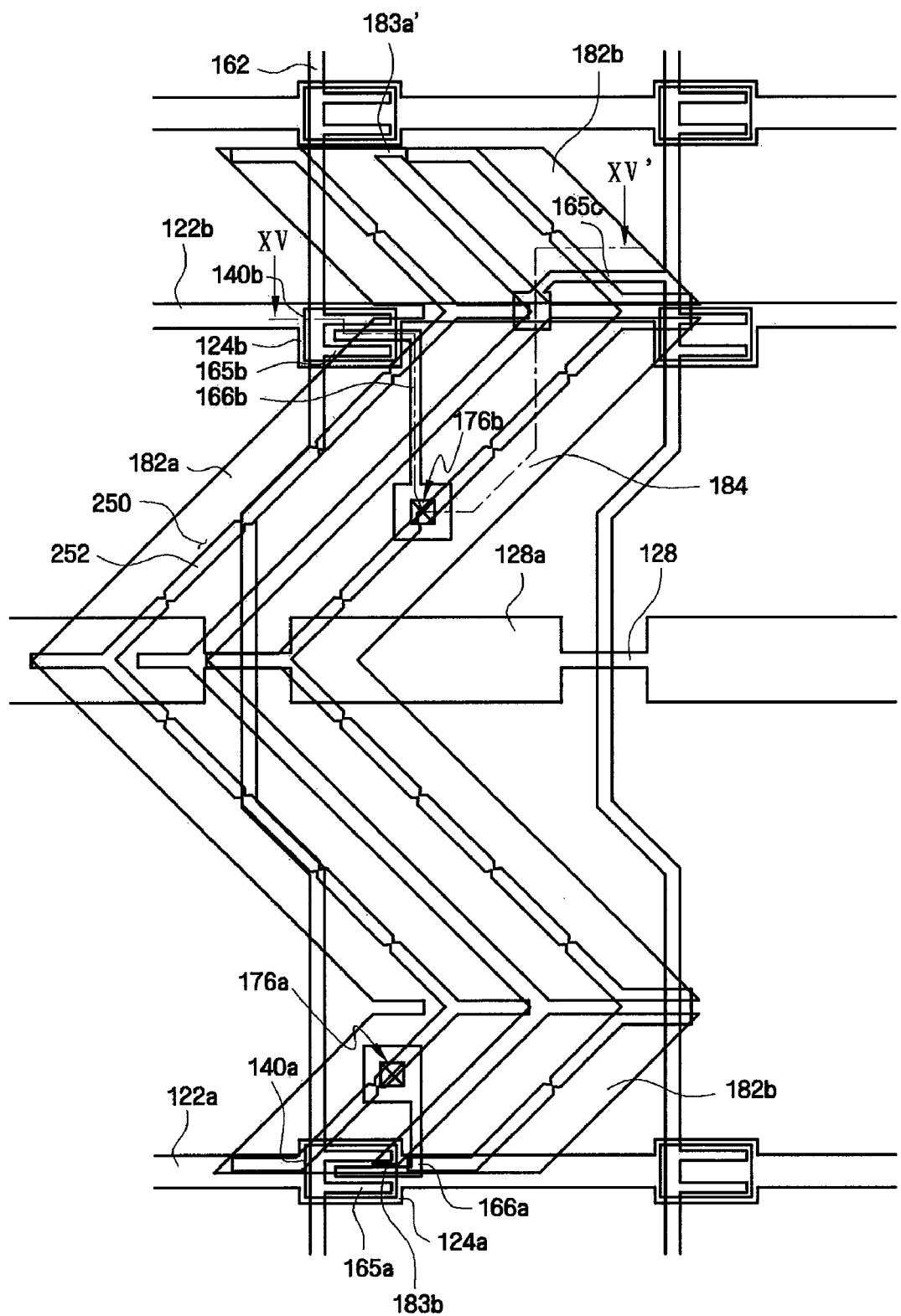
FIG. 14 is a layout of an LCD according to another embodiment of the present invention.
Figure 15:
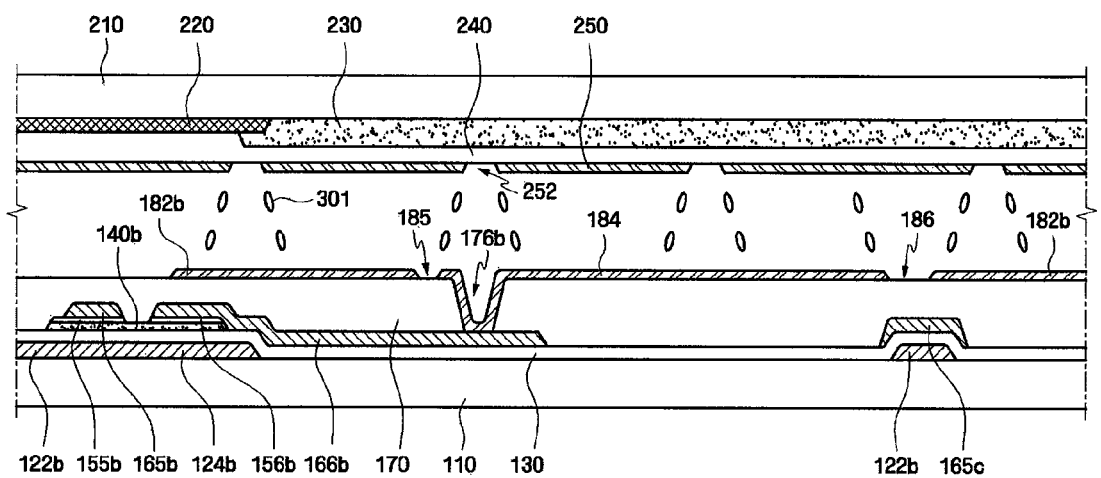
FIG. 15 is a cross-sectional view taken along line XV-XV' of FIG. 14.

FIGS. 13A through 15 illustrate an LCD according to another embodiment of the present invention. FIG. 13A is a layout of a first display panel according to another embodiment of the present invention, FIG. 13B is a layout illustrating the relationship between a pixel electrode and first and second gate lines illustrated in FIG. 13A, FIG. 14 is a layout of an LCD according to another embodiment of the present invention, and FIG. 15 is a cross-sectional view taken along line XV-XV' of FIG. 14.

Referring to FIGS. 13A through 15, a second gate line 122b of a first display panel of the LCD, like the second gate line 122b of the LCD illustrated in FIGS. 10A through 12, is disposed so as to cross a pixel by overlapping a first bend 187a, and a first sub-pixel electrode and a second sub-pixel electrode 184 have the same shapes as their respective counterparts in the LCD illustrated in FIGS. 10A through 12.

According to the present embodiment, a third source electrode 165c, instead of the third drain electrode 166c, is formed in the overlapping area of the second gate line 122b and a slanted gap 185. The third source electrode 165c branches off from a data line 162 which is adjacent to a data line 162 (hereinafter referred to as the current data line 162) that is associated with the pixel. Alternatively, the third source electrode 165c may branch off from the current data line 162. The voltage applied to the third source electrode 165c may vary according to the voltage applied to the current data line 162. As described above, the voltage applied to the current data line 162 may be within the range of about 0-15 V. In this case, the voltage applied to the current data line 162 is not much different from the voltage applied to the first sub-pixel electrode or the second sub-pixel electrode 184, even though the voltage applied to the second gate line 122b is about −7 V. Accordingly, the alignment angle of a liquid crystal layer is not greatly affected by the voltage applied to the current data line 162, thus alleviating light leakage.

Even though the third drain electrode 166c or the third source electrode 165c is illustrated in FIGS. 10A through 12 or 13A through 15 as being overlapped by the slanted gap 185, the third drain electrode 166c or the third source electrode 165 may be overlapped by a horizontal gap if the second gate line 122b is exposed through the horizontal gap 165.

As described above, according to the present invention, a pixel electrode is divided into two sub-pixel electrodes, and the two sub-pixel electrodes are respectively driven by two TFTs. Thus, it is possible to guarantee lateral visibility and to prevent light leakage by preventing the transmission of an electric field generated by a second gate line to a liquid crystal layer.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:
1. A liquid crystal display (LCD) comprising:
first and second gate lines which extend in a horizontal direction;
a data line which is insulated from the first and second gate lines and crosses the first and second gate lines;
first and second thin film transistors (TFTs) which are respectively connected to the first and second gate lines and are connected to the data line; and
a pixel electrode which extends in zigzag fashion at an inclination to the first and second gate lines and is divided into a first area and a second area in a direction in which the pixel electrode extends,
wherein the pixel electrode comprises a first sub-pixel electrode which is connected to the first TFT and is comprised of the first area and an upper second portion and a lower second portion of the second area, a second sub-pixel electrode, which is connected to the second TFT, is comprised of a middle portion of the second area, and has a lateral side adjoining a first portion of the first sub-pixel electrode, an upper side adjoining a lower side of the upper second portion of the first sub-pixel electrode, and a lower side adjoining an upper side of the lower second portion of the first sub-pixel electrode, the first and second areas of the first sub-pixel electrode are connected by a plurality of connection electrodes, and at least one of the connection electrodes overlaps the second gate line.

2. The LCD of claim 1, wherein the second gate line is disposed so as to cross the first portion and the upper second portion of the first sub-pixel electrode.

3. The LCD of claim 2, wherein a pair of lateral sides of the pixel electrode extend in parallel to each other, and wherein the LCD further comprises a slanted gap which is formed along a boundary between the first area and the second area and extends in zigzag fashion in parallel to the lateral sides of the pixel electrode.

4. The LCD Of claim 3, wherein the lateral sides of the pixel electrode and the slanted gap form an inclination of 45° or −45° with the first and second gate lines.

5. The LCD of claim 3, wherein the pixel electrode comprises at least one bend where a direction of inclination of the lateral sides of the pixel electrode with respect to the first and second gate lines changes, and wherein the LCD further comprises a horizontal gap which is formed at the bend, extends in parallel to the first and second gate lines, and is connected to the slanted gap.

6. The LCD of claim 5, wherein the pixel electrode comprises three bends, wherein the three bends comprise first, second, and third bends that are sequentially arranged from the top of the pixel electrode.

7. The LCD of claim 6, wherein the second gate line is located nearer than the first bend to the top of the pixel electrode, and the pixel electrode is symmetrical with respect to the second bend vertically.

\* \* \* \* \*